United States Patent [19]
Revelli, Jr. et al.

[11] Patent Number: 5,291,567
[45] Date of Patent: Mar. 1, 1994

[54] ELECTRO-OPTIC WAVEGUIDE DEFLECTOR USING A NONLINEAR OPTIC FILM OR LIQUID-CRYSTAL OVERLAY CELL FOR USE IN AN OPTICAL PICKUP HEAD

[75] Inventors: Joseph F. Revelli, Jr., Rochester; Thomas L. Penner, Fairport; Nancy J. Armstrong, Ontario; Douglas R. Robello, Webster; Jay S. Schildkraut, Rochester, all of N.Y.

[73] Assignee: Eastman Kodak Company, Rochester, N.Y.

[21] Appl. No.: 916,422

[22] Filed: Jul. 21, 1992

[51] Int. Cl.⁵ .............................................. G02B 6/10
[52] U.S. Cl. .......................................... 385/8; 385/14; 385/143
[58] Field of Search .............................. 385/8, 14, 143

[56] References Cited

U.S. PATENT DOCUMENTS

| | | | |
|---|---|---|---|
| 3,923,376 | 12/1975 | Martin | 385/8 |
| 3,924,931 | 12/1975 | Cheo | 385/8 |
| 4,000,937 | 1/1977 | Kaminow | 385/8 |
| 4,179,184 | 12/1979 | Nelson | 385/8 |
| 4,536,450 | 8/1985 | Garito | 428/411.1 |
| 4,605,869 | 8/1986 | Choe | 372/21 |
| 4,607,095 | 8/1986 | Kuder | 359/242 |
| 4,615,962 | 10/1986 | Garito | 430/20 |
| 4,624,872 | 11/1986 | Stuetz | 372/21 |
| 4,694,066 | 9/1987 | DeMartino et al. | 528/373 |
| 4,755,036 | 7/1988 | Suzuki et al. | 385/8 |
| 4,775,207 | 10/1988 | Silberberg | 385/8 |
| 4,792,201 | 12/1988 | Suzuki et al. | 385/8 |
| 4,792,208 | 12/1988 | Ulman et al. | 385/143 |
| 4,802,153 | 1/1989 | Kataoka et al. | 369/44.12 |
| 4,900,127 | 2/1990 | Robello et al. | 385/141 |
| 4,902,088 | 2/1990 | Jain et al. | 385/8 |
| 4,946,235 | 8/1990 | Scozzafava et al. | 385/122 |
| 4,948,225 | 8/1990 | Rider et al. | 385/2 |
| 4,955,977 | 9/1990 | Dao et al. | 385/130 |
| 4,971,426 | 11/1990 | Schildkraut et al. | 385/2 |
| 5,052,771 | 10/1991 | Williams et al. | 385/8 |
| 5,093,874 | 3/1992 | Hawkins et al. | 385/8 |

OTHER PUBLICATIONS

Himel et al., IEEE Photonics Technology Letters, vol. 3, pp. 921–923, (1991), "Electrooptic Beam Deflection Using the Leaky Mode of a Planar Waveguide".
Arimoto et al., "Waveguide Optical Deflector for an Optical Tracking Actuator Using a Surface Acoustic Wave Device", Applied Optics, vol. 29, pp. 247–250, (1990).
D. J. Williams, "Organic Polymer and Non-Polymeric Materials with Large Optical Nonlinearities," Int. Ed. Engl. vol. 23, pp. 690–703, (1984).
Kaminov and Stulz, IEEE JQE, pp. 633–635, (Aug. 1975), "A planar electro–optic prism switch".
Sheridan and Giallorenzi, Journal of Applied Physics, vol. 45, pp. 5160–5163 (1974), "Electro–optically induced deflection in liquid–crystal waveguides".

Primary Examiner—Frank Gonzalez
Attorney, Agent, or Firm—Robert Luke Walker

[57] ABSTRACT

An electro-optic waveguide deflector appropriate for use in an optical pickup head uses any film exhibiting high second order susceptibility such as nonlinear optic organic Langmuir-Blodgett films or nonlinear optic organic poled polymer films, or a liquid-crystal overlay cell. The deflector comprises a base support, a planar electrode layer disposed on the base support, a first buffer layer atop the first electrode layer, and an optical waveguide layer overlying the first buffer layer and planar electrode. When nonlinear optic films are used to form the waveguide layer, a second buffer layer is disposed atop the waveguide layer, and a pair of spaced electrodes is disposed atop the second buffer layer. When a nematic-type liquid-crystal overlay cell is used, it is disposed atop a passive dielectric waveguide, and a pair of spaced electrodes is disposed on the under surface of the liquid-crystal cell cover plate. The spaced electrodes are shaped so that selectively applying an electric field causes deflection to vary with the applied voltage according to the geometrical configuration of the spaced electrodes.

19 Claims, 5 Drawing Sheets

WAVELENGTH=633NM, L=1.905 CM

ELECTRO-OPTIC WAVEGUIDE DEFLECTOR USING A NONLINEAR OPTIC FILM OR LIQUID-CRYSTAL OVERLAY CELL FOR USE IN AN OPTICAL PICKUP HEAD

TECHNICAL FIELD

This invention pertains to an optical pickup head, and, more particularly, to an electro optic waveguide deflector for such a pickup head.

BACKGROUND OF THE INVENTION

Tracking is one of the functions that must be provided in an optical pickup head. Currently, many optical heads use an electro-mechanical voice coil actuator to physically translate the optical head, and the voice coil is part of a servo loop used to correct tracking error. The tracking actuator generates a corrective cross-track motion in response to the tracking error signal generated by the optical head itself. Unfortunately, the mass and size of the electro-mechanical actuator increases the cost of the optical head, and, due to inertia, limits the bandwidth of the optical head. Furthermore, coupling of the mechanical motions of the tracking and focus servos can cause unwanted crosstalk between these two channels. Accordingly, it will be appreciated that it would be highly desirable to have a low mass tracking actuator in a waveguide optical pickup head. It is also desirable to have a deflector or nonmoving part as an electrically controlled fine tracking actuator in a waveguide optical pickup head.

Waveguide optical pickup heads are disclosed by Kataoka et al in U.S. Pat. No. 4,802,153 and by Arimot et al, Applied Optics, Vol. 29, 1990, pp. 247–250. Both describe integrated optic heads which employ surface acoustic wave (SAW) deflectors. Unfortunately, the SAW waveguide deflector requires a high power, variable frequency RF generator, and the RF noise generated may interfere with other parts of the system. The SAW provides low diffraction efficiency deflection, and diffraction efficiency is dependent on the diffraction angle.

Another manner of deflecting light in waveguides is disclosed by Kaminow and Stulz IEEE JQE, Aug. 1975, pp. 633–635, wherein tilted surface electrodes are deposited on a planar electro-optic waveguide to effect an electrically tunable deflection of the beam. Unfortunately, the planar electro-optic prism deflector relies on the rather weak electro optic coefficient of inorganic materials such as $LiNbO_3$, and employs inefficient interaction between surface electrode fringing fields and guided light. Consequently, high voltages are required to drive this device. Also, the planar electro-optic prism deflector has an aperture limited to 100 μm or so compared to a required aperture of several millimeters for a waveguide optical pickup head.

Planar electro-optic waveguide beam deflectors have also been described by Himel et al in IEEE Photonics Technology Letters, Vol. 3, 1991, pp. 921–923, and by Martin in U.S. Pat. No. 3,923,376. Both describe planar waveguide devices in which the optical beam is deflected in a direction normal to the plane of the waveguide. In the former case, an electrically conductive substrate supports a multimode optical waveguide of electro optic material which varies in electrical resistivity as a function of its thickness. Application of an electrical potential between an upper planar electrode and the substrate causes a gradient in the refractive index normal to the plane of the waveguide due to the gradient in electrical resistivity of the electro-optic material. This gradient in index of refraction causes the out-coupled light to deflect in a direction perpendicular to the plane of the waveguide. In the latter case, an electro-optic material is placed atop a waveguide such that guided light in the waveguide leaks into the high index electro-optic material Application of an electrical potential between planar electrodes which are placed atop the electro-optic material and on the bottom of the substrate which supports the waveguide causes the light which leaks into the electro-optic material to deflect in a direction normal to the waveguide plane. The primary disadvantage of these devices is that the electrodes are placed on either side of the substrate requiring high voltage to effect significant deflection. Another disadvantage of these devices is that the wavefront quality of the out-coupled beam can be distorted by the existence of multiple modes in the former disclosure and by the use of leaky modes in the latter. Finally, the fact that the beam is deflected in a direction perpendicular to the plane of the waveguide makes it more difficult to construct truly compact waveguide pickup heads.

Electro-optic deflection in liquid-crystal waveguides has been disclosed by Sheridan and Giallorenzi, Journal of Applied Physics, Vol. 45, Dec. 1974, pp. 5160–5163, and by Hu et al in IEEE Journal of Quantum Electronics, Vol. QE-10, Feb. 1974. Although these devices exhibit continuous deflection through relatively large angles (greater than 20 degrees), light guided in liquid-crystal waveguides suffers severe propagation losses due to scatter caused by fluctuations in the liquid-crystal director orientation. Furthermore, the bandwidths of these devices are limited by electrically induced hydrodynamic instabilities.

Recently, strides have been made in the area of nonlinear optical organic (NLO) materials. For example, U.S. patent application Ser. No. 735,550, filed Jul. 25, 1991 by Penner et al., for Improved Conversion Efficiency Second Harmonic Generator, discloses means of forming poled noncentro-symmetric organic molecules by means of the Langmuir-Blodgett (L-B) technique. The use of electrically poled nonconcentro-symmetric organic molecules in guest host polymer structures has been advanced U.S. Pat. No. 4,900,127 discloses another means of obtaining nonlinear optic organic polymers D.J. Williams disclosed specific nonlinear organic molecules with large second order hyperpolarizabilities in an article "Organic Polymer and Non Polymeric Materials with Large Optical Nonlinearities", Anqew. Chem., Int. Ed. Engl. Vol. 23 1984, pp. 690–703. Other references to organic nonlinear optical media in the form of transparent thin films are described in U.S. Pat. Nos. 4,694,066; 4,536,450; 4,605,869; 4,607,095; 4,615,962; and 4,624,872.

It is desirable to have a low mass tracking actuator that is a deflector or nonmoving part useful as an electrically controlled fine tracking actuator in a waveguide optical pickup head. It is also desirable to utilize nonlinear optic organic materials and reduce the need for a high power, variable frequency RF generator and the associated RF noise.

SUMMARY OF THE INVENTION

The present invention is directed to overcoming one or more of the problems set forth above. Briefly summarized, according to one aspect of the present invention, an integrated electro optic waveguide deflector comprises a base support, a planar electrode layer disposed on the base support, a first buffer layer atop the first electrode layer, an optical waveguide layer formed of a material with high second order susceptibility overlying the first buffer layer and planar electrode, a second buffer layer atop the waveguide layer, a pair of spaced electrodes atop the second buffer layer, and means for selectively applying an electric field between the pair of electrodes and the planar electrode so that deflection varies with the applied voltage according to the geometrical configuration of the pair of spaced electrodes. Alternatively, the positions of the planar electrode layer and the pair of spaced electrodes can be interchanged so that the pair of spaced electrodes are disposed on the base support and the planar electrode is placed atop the second buffer layer.

According to another aspect of the present invention, an integrated electro-optic waveguide deflector uses liquid-crystal cells that are adjacent to passive or non-electooptic waveguides. The liquid-crystal overlay cell has an index of refraction less than the index of refraction of the passive waveguide so that only the evanescent portion of the guided light extends into the adjacent liquid-crystal region thereby reducing the propagation loss due to scatter in the liquid-crystal region. The deflector comprises a base support, a planar electrode layer disposed on the base support, a buffer layer atop the first electrode layer, a high index passive optical waveguide layer overlying the buffer layer and planar electrode, and a first alignment layer atop the passive waveguide layer. A nematic liquid-crystal cell is disposed atop the passive waveguide overlying the first alignment layer. The liquid-crystal cell is comprised of a nematic liquid-crystal mass contained on four sides by spacer material and covered by a cover plate upon which has been disposed a pair of spaced electrodes and a second alignment layer. A means is provided for selectively applying an electric field between the pair of electrodes on the cover plate and the planar electrode on the base support so that deflection varies with the applied voltage according to the geometrical configuration of the pair of spaced electrodes.

The present invention is an electro-optic waveguide deflector that uses poled organic nonlinear optic films formed by the L-B technique or by spin-coated poled nonlinear optic organic polymers or copolymers or any other material with a high second order susceptibility that can be generally applied as a thin film. Such a deflector is useful as a nonmoving part, electrically controlled, fine tracking actuator in a waveguide optical pickup head.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
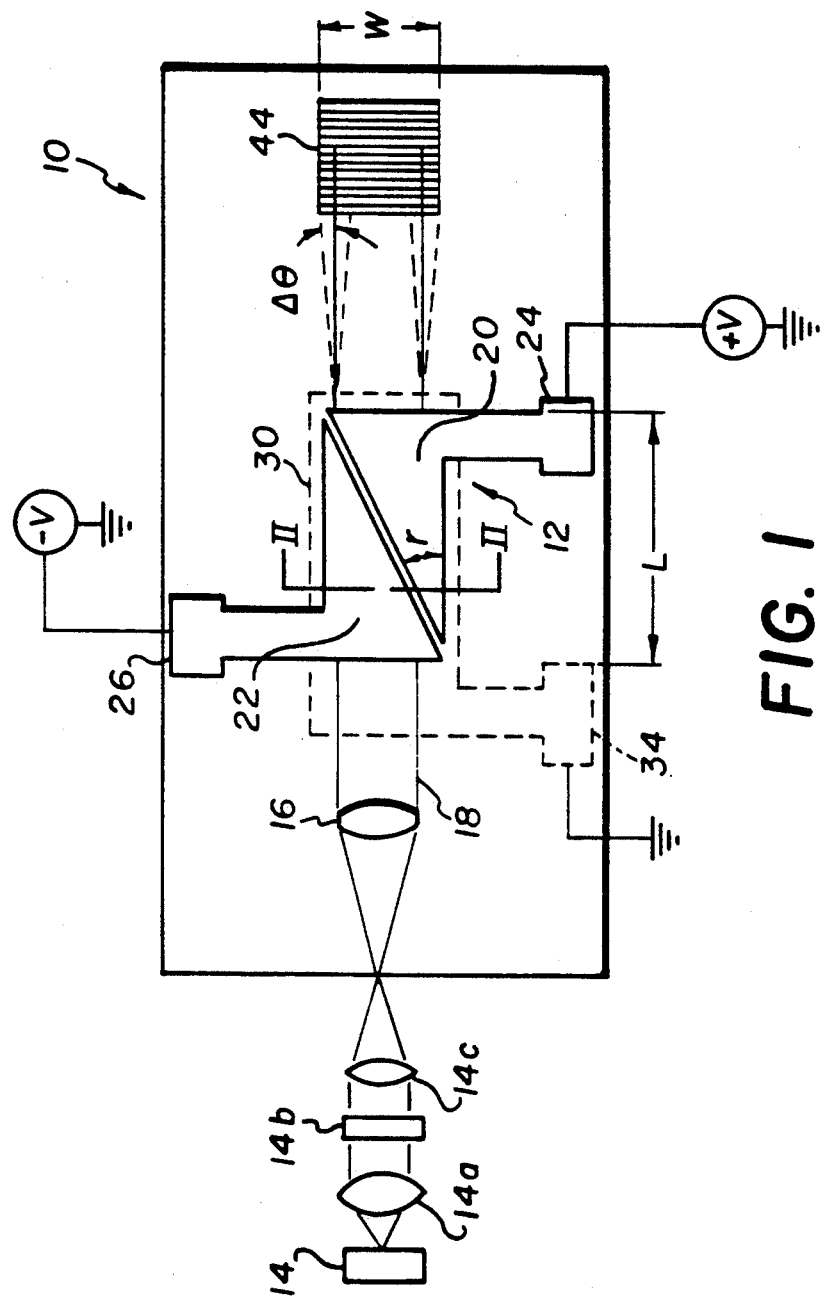
FIG. 1 is a diagrammatic plan view of a preferred embodiment of an electro-optic device incorporating a waveguide deflector according to the present invention.
Figure 2:
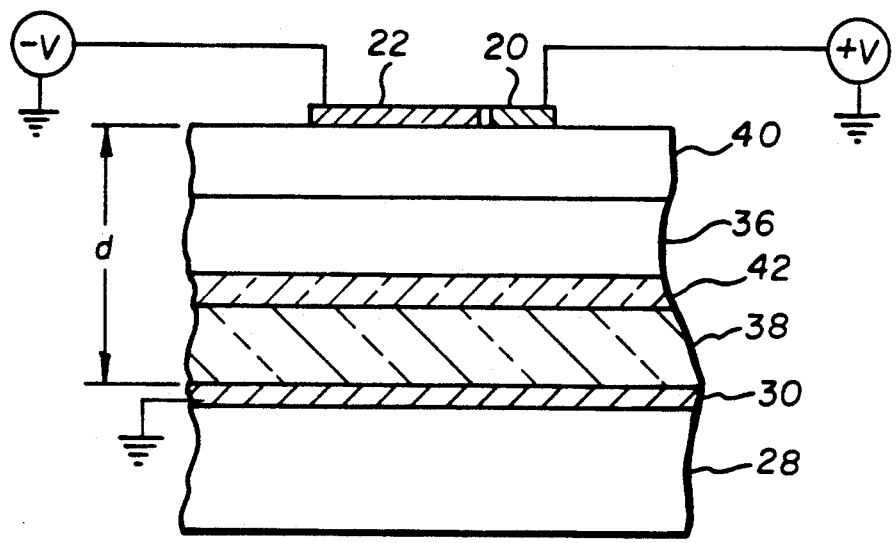
FIG. 2 is a sectional view of the waveguide deflector taken along line II—II of FIG. 1.

Referring to FIGS. 1-2, an electro-optic device 10 incorporates a waveguide deflector 12. Light from laser diode 14 is collimated by lens 14a and the polarization can be rotated by halfwave plate 14b. Lens 14c couples the light into waveguide device 10. By this method, TE polarized light from the laser diode can be converted to TM polarized light. The collimated beam 18 passes beneath the pair of prism-shaped surface electrodes 20, 22 that are energized with voltages of opposite polarities through contact pads 24, 26, respectively. A substrate 28 represents a support structure for the multilayer stack that is to be deposited on top. The substrate 28 can be made of glass or silicon and is typically 0.5 to 2 cm wide, 3 to 7 cm long, and 1 to 5 mm thick.

A planar thin metal film electrode 30 is deposited directly on the substrate 28. This metal film 30 represents the lower ground electrode for electro-optic deflector 12, and, as such, must extend over the region which defines this deflector (FIG. 1). If the substrate material is silicon, the metal film 30 can be eliminated providing the silicon is p+ doped. Contact is made to the ground electrode 30 by means of contact pad 34.

Referring to FIG. 2, the waveguide layer 36 is preferably a Langmuir-Blodgett or poled polymer film of thickness 0.05 to 5.0 μm. The organic film 36 is bounded on either side by transparent, low index, buffer layers 38, 40 that have a thickness of about 1.0 to 10.0 μm. Where the L-B film 36 cannot be made thick enough to support a single guided optical mode, it may be necessary to deposit an additional layer 42 of transparent, high index material on top of the lower buffer layer 38 before the L-B film 36 is coated thereon. The index of refraction of the additional layer 42 should be approximately equal to the index of refraction of the L-B film 36. The film 36 itself is formed so that the noncentrosymmetric molecules that comprise the film are oriented in the same direction; the film is automatically poled. The axis of alignment for the molecules should be perpendicular to the plane of the waveguide. Alternatively, the nonlinear waveguide film 36 could be formed of a spin coated, electrically poled copolymer exhibiting large second order hyperpolarizability. In this case, the additional layer 42 would not be required.

Again referring to FIGS. 1-2, there are two upper metal electrodes 20 and 22. In the case of the spin-coated copolymer film, the electrodes 20, 22 are temporarily shorted together and used to electrically pole the film in the region directly below the electrodes. Poling is accomplished by heating the polymer to a temperature 5° to 10° above its glass transition temperature while applying an electric field of 5 to 15 volts per micron between the shorted upper electrode 20 or 22 and the ground electrode 30. After cooling to room temperature, the electric field is removed. The electrodes 20, 22 are then disconnected from one another and energized with opposite polarity voltages (with respect to the ground electrode 30) to effect deflection of the optical beam 18. This generates electric fields of opposite direction in regions directly below the electrodes 20, 22. The positions of the ground electrode 30 and the electrodes 20, 22 could be interchanged so that the ground electrode is positioned atop layer 40 and the electrodes 20, 22 are positioned on base support 28.

Waveguide layer 36 can in fact be made of any material, either organic or inorganic, which exhibits a high second order susceptibility. The only additional constraint on the material is that it can be generally applied as a uniform thin film.

Figure 3:
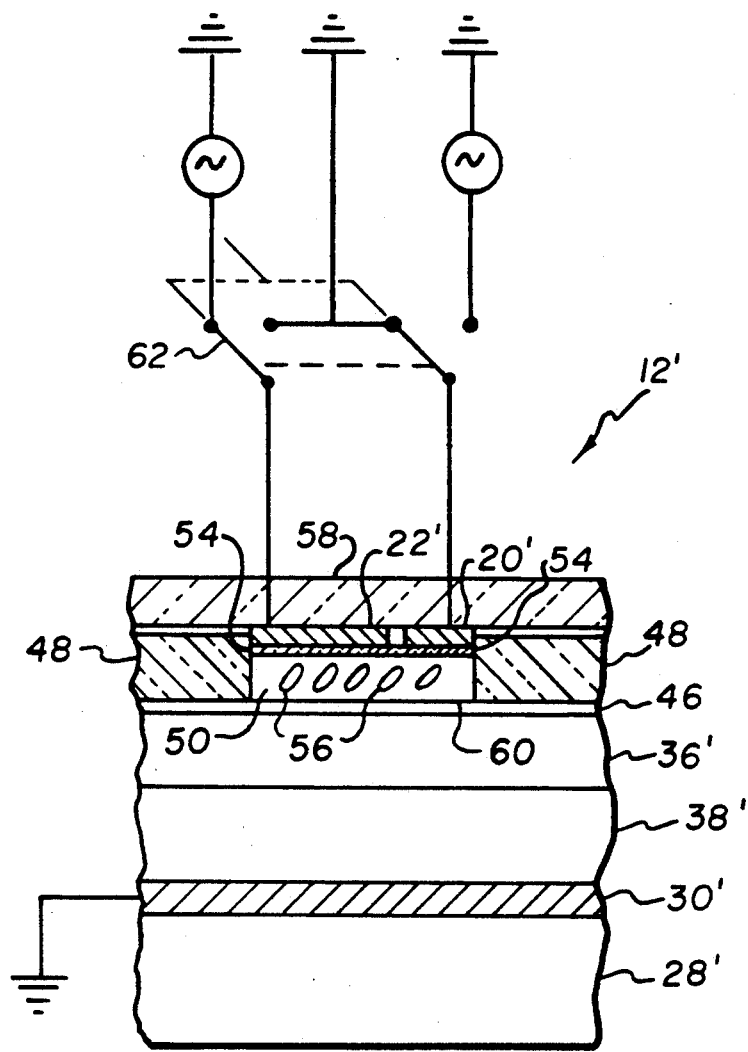
FIG. 3 is a sectional view of a waveguide deflector similar to FIG. 2, but illustrating another preferred embodiment employing a liquid-crystal cell overlying a passive high index waveguide.

Referring to FIG. 3, another preferred embodiment of the electro-optic waveguide deflector 12' incorporating a liquid-crystal cell 60 adjacent to a high index passive waveguide 36' is illustrated. A planar thin metal film electrode 30' is deposited directly on the substrate 28'. This metal film 30' represents the lower ground electrode for the electro-optic deflector 12', and, as such, must extend over the region which defines the deflector. If the substrate material is silicon, the metal film 30' can be eliminated providing the silicon is p+ doped. Contact is made to the ground electrode 30' by the contact pad 34 (FIG. 1).

The passive waveguide layer 36' is a high index transparent dielectric thin film such as $Ta_2O_5$ or $SiO_xN_y$ of thickness 0.1 to 1.0 μm. A lower index transparent buffer layer 38' about 1.0 to 10.0 μm in thickness forms the lower boundary of the waveguide layer 36'. The upper boundary is formed by a thin alignment layer 46. This alignment layer 46 is typically 50 to 150 Å in thickness and is deposited by evaporation of SiO onto the waveguide surface 36' at a grazing angle (typically 2 to 10 degrees to the surface). The SiO layer causes the director of nematic liquid-crystals to align nearly parallel to the surface of the waveguide layer 36' in the absence of an applied electric field. The alignment direction is chosen such that this direction lies in the plane defined by the normal to the planar waveguide 36' and the propagation direction of the guided light. A chamber 50 is formed by the first alignment layer 46 below, by transparent spacers 48 on four sides, and by glass cover 58 above. Two prism shaped upper metal electrodes 20' and 22' are deposited on the lower surface of the glass cover 58, and a second alignment layer 54 is deposited on top of the electrodes 20', 22'. The chamber 50 is then filled with nematic liquid crystal mass 56. The upper electrodes 20' and 22' are energized so that one electrode is shorted to ground while an alternating current (ac) electric potential is applied between the other electrode and the ground electrode 30'. The liquid-crystal molecules 56 rotate to align with the applied electric field, and, as a result, the index of refraction sampled by the evanescent field of TM-polarized light propagating in the passive waveguide beneath the energized electrode is modified. This causes deflection of the guided light in the plane of the waveguide at the boundary between the energized and shorted electrodes. Interchanging the energized and shorted electrodes by means of switch 62 causes the guided light to deflect in the opposite direction. If the frequency of the ac voltage is between 5 and 20 Khz, the liquid-crystal molecules will respond only to the rms value of the applied voltage. The use of an ac voltage is necessary in order to prevent electro-chemical decomposition of the liquid-crystal material.

Figure 4:
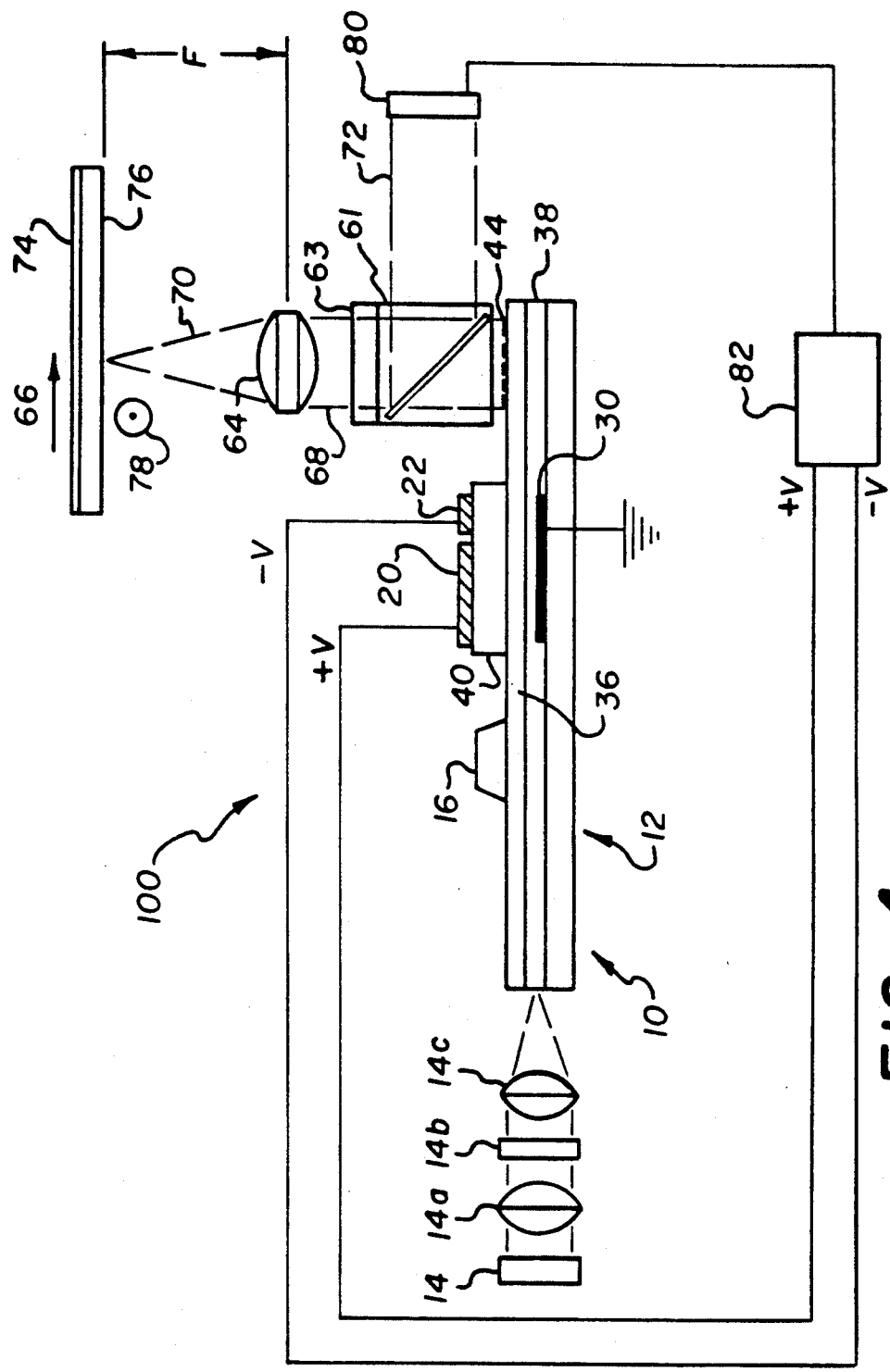
FIG. 4 is a diagrammatic side view of an optical pickup head incorporating an electro-optic waveguide deflector.

FIG. 4 is a diagrammatical side view of an optical pickup head 100 incorporating an electro-optic waveguide device 10 formed with a nonlinear optic film. The operation of the optical pickup head 100 is briefly summarized hereinbelow with emphasis on the function of the electro-optic waveguide deflector 12. The upper buffer layer 40 is shown only in the region directly beneath the electrode pair 20, 22. Limiting the buffer layer 40 to the electrode region simplifies the design and fabrication of the waveguide lens 16 and grating coupler 44. The waveguide lens 16 is shown as a mode-index type as is well known in the art (see, for example, U.S. patent application Ser. No. 377,699 filed Jul. 10, 1989, pending, in the name of J.C. Brazas). Other suitable waveguide lenses, such as a Luneburg lens, Bragg-grating lens, geodesic lens, or the like, may be substituted for the mode-index type of lens. TM-polarized light is coupled out of the electro optic waveguide device 10 by means of grating coupler 44 and passes through polarizing beam splitter (PBS) 61. After passage through quarterwave plate 63, circularly polarized and collimated beam 68 is focused onto the information-bearing surface 76 of optical disk 74 by objective lens 64. Recorded data in the form of pits and land areas lie along tracks on the surface 76 which are parallel to direction 66. Focused beam 70 reflects off of the information-bearing surface 76 and is recollimated by objective lens 64. Quarterwave plate 63 converts the circularly polarized light returning from optical disk 74 to s-polarized light which is reflected by PBS 61 into collimated beam 72. Beam 72 is incident on receiver section 80 which extracts tracking error, focus error, and rf signals by means which are well known in the art and are not shown in the diagram.

Runout of the optical disk 74 as it spins causes motion of the tracks in direction 78 (out of the plane of the page) which is along the disk radius and perpendicular to the track direction 66. The tracking error signal from receiver section 80 is amplified and modified by processor 82 such that the output of processor 82 can be used to supply the voltage which energizes electrodes 20, 22. Deflection of the guided beam by electrooptic waveguide deflector 12 causes focused beam 70 to move in a direction which compensates for the track displacement due to optical disk runout.

Again referring to FIG. 1, the electro-optically induced index change in the nonlinear medium beneath the electrodes 20, 22 causes a deflection of the beam 18. The deflection varies with the applied voltage according to the formula:

$$\Delta\Theta \approx a \frac{\Delta n}{n} \tan \Gamma \qquad \text{Eqn. 1}$$

where $\Delta\Theta$ is the deflection angle of the collimated beam 18 in the waveguide, $\Delta n$ is the electro-optically induced index change, n is the effective index of refraction of the waveguide, and $\Gamma$ is the angle of the surface electrode prisms 20, 22. The parameter a is equal to 2 for nonlinear optic films such as the Langmuir-Blodgett and poled polymer films, and equal to 1 for the liquid-crystal overlay cell. In the case of nonlinear optic films, $\Delta n$ is related to the applied voltage by the expression:

$$\Delta n = \frac{n^3}{2} r_{33} \frac{V}{d} \qquad \text{Eqn. 2}$$

where it is assumed that TM polarized light is propagated in the waveguide film 36 and $r_{33}$ is the electro-optic coefficient relating the change in index in the nonlinear optic film to the electric field applied along the poling axis for light polarized along the poling axis. The separation between the upper electrodes 20, 22 and the lower ground electrode 30 is represented by "d". It is assumed in Eqn. 2 that the dielectric constant of the various layers 38, 36, 40, 42 are approximately equal. The equation must be modified if there is significant deviation from this condition of equal dielectric constant. Light is coupled out of the waveguide by means of grating 44.

TE polarized light could be used instead of TM polarized light in the case of the nonlinear optic organic waveguide deflector. In this case the $r_{33}$ coefficient in Equation 2 must be replaced by the $r_{13}$ coefficient. TE polarization is less desirable because the $r_{13}$ coefficient is only about one third that of the $r_{33}$ coefficient for the organic nonlinear optic materials.

In the case of the electro-optic waveguide deflector incorporating the liquid-crystal overlay cell the computation of $\Delta n$ is more complicated. The modal wave equation must be solved for a waveguide system which is comprised of an inhomogeneous, anisotropic liquid-crystal mass adjacent to isotropic, homogeneous transparent dielectric layers. The solution of this equation yields the effective index of refraction of the system, $n_{eff}$, which varies as the voltage across the liquid-crystal cell is changed. Thus $\Delta n$ is given by $\Delta n_{eff}(V)$. The solution for such complex waveguide systems is described in detail in the literature (see, for example, Hu and Whinnery, IEEE Journal of Quantum Electronics, Vol. QE-10, July 1974, pp. 556-562). TM polarized light must be used for this particular embodiment.

When this device is used as a nonmoving part tracking actuator in an optical pick-up head, it is important to know the actual displacement of the focused spot in the cross-track direction that can be realized at the disk for a given applied voltage. This can be calculated with the formula:

$$\Delta x \sim af \Delta n \tan \Gamma. \qquad \text{Eqn. 3}$$

In Eqn. 3, $\Delta x$ is the displacement of the focused spot at the information-bearing surface of the optical disk in the cross-track direction 78, and f is the focal length of the objective lens 64 (see FIG. 4). $\Delta n$ is given by Eqn. 2 in the case of the nonlinear optic organic film or by $\Delta n_{eff}(V)$ in the case of the liquid-crystal overlay cell. Typically the surface prism electrodes 20, 22 will have a length L of about 2 cm and a width W of about 0.5 cm yielding a value of tan $\Gamma=4$. Furthermore, assuming values of:

$$r_{33} \approx 30 \times 10^{-12} \frac{m}{V}$$

$$f \approx 3 \text{ mm}$$
$$n \approx 1.6$$
$$V \approx \pm 100 \text{ volts}$$
$$d = 5 \mu m$$

values can be calculated for $$\Delta n \sim 1.2 \times 10^{-3} \qquad \text{(Eqn. 2)}$$

$$\Delta \Theta \sim 6.2 \text{ mrad} \qquad \text{(Eqn. 1),}$$

and $$\Delta x \sim \pm 30 \mu m. \qquad \text{(Eqn. 3).}$$

This displacement corresponds to $\pm 15$ tracks for a typical optical disk with track pitch of 2 $\mu$m, and is sufficient for fine tracking. The maximum voltage required for a given maximum displacement varies inversely with the material coefficient $r_{33}$. The $r_{33}$ coefficient assumed in the above computations is approximately equal to that of $LiNbO_3$. Many of the newer organic electro-optic materials have $r_{33}$ coefficients significantly larger than that of $LiNbO_3$ and require correspondingly lower drive voltages.

The primary advantage of the electro-optic waveguide tracking servo device is that it has a significantly higher bandwidth compared to conventional bulk optical heads using electro-mechanical actuators. This is true because the present invention is made with lower mass, and, consequently, the radial access mechanism will generate more acceleration for a given force. Fine tracking is accomplished electro optically and is limited only by the RC rise time of the surface prism electrode structure at least in the case of the nonlinear optic organic film deflector. An additional advantage of the present invention is that cross-talk or cross-coupling between the fine tracking servo system and the focus servo system is negligible because the tracking servo system is not mechanical while the focus servo system is mechanical.

The present invention exhibits low power consumption because relatively little power is required to drive the surface prism capacitor. In the electro-optic waveguide deflector embodiments which involve nonlinear optic organic films, such as Langmuir-Blodgett or poled polymers, lower drive voltages can also be used to energize the deflector. Furthermore, in these cases, the resultant electric fields are far more uniform compared to prior art devices such as the one disclosed by Kaminow. The lower voltage drive is possible because there is better overlap between the electric field applied across the thin nonlinear optic organic film and the light guided in the film, and the electro-optic coefficient of the organic material of the film can be made larger than that of other electro-optic materials. The improved field uniformity is possible because the electric field is applied between closely spaced plate like electrodes above and below the organic film instead of being applied as a fringing field between adjacent fingers on the surface of a bulk crystal of inorganic electro-optic material, such as the Kaminow device. Another advantage of the L-B films in particular is that they do not require electrical poling. Furthermore, it does not generate RF noise which could interfere with other parts of the pick-up head. These are advantages over the prior art SAW-type waveguide device mentioned above. Also, the use of relatively inexpensive organic materials make the present invention cheaper to produce. The ability to apply the organic materials or the liquid crystal overlay cell to a broad range of substrates adds to the design flexibility of such devices compared to either SAW-type devices or $LiNbO_3$-based electro-optic devices. Finally, immunity to so-called optical damage makes the nonlinear optic organic and the liquid crystal materials more desirable than the inorganic materials such as $LiNbO_3$.

A preferred embodiment of the present invention uses Langmuir-Blodgett layers as described below as the nonlinear optical material. Portions of the detailed description of copending application Ser. No. 07/735,550, filed Jul. 25, 1991 are incorporated hereinbelow. The construction of an optical article for precisely modulating the phase-front of a guided wave places stringent requirements on the nonlinear optical layer:

(a) The thickness of the nonlinear optical organic (NLO) layer must be at least 70 per cent of the wavelength $\lambda$, the wavelength of light in free space which, for typical applications is in the range of 1.0 $\mu$m to 300 nm.

(b) The NLO layer must be substantially transparent to $\lambda$.

(c) The NLO layer must exhibit an absolute electro-optic coefficient of at least $$10 \frac{pm}{V}.$$

(d) The NLO layer must incorporate molecular dipoles which all have the same polarity. In particular, it will be appreciated that with polarization of the electromagnetic radiation so that the electric field is perpendicular to the major surface 105 in FIG. 2 (i.e., TM polarization) a more efficient interaction with the dipole of the L-B film is possible.

Taking all of the above factors into consideration, it is apparent that Langmuir-Blodgett film assemblies satisfy the requirements of the optical articles of the invention.

The molecules used to construct L-B films are amphiphiles; that is, compounds that contain at least one hydrophilic moiety (Hy), also commonly referred to as a head group, and at least one lipophilic moiety (L), also commonly referred to as a tail group, joined through a linking group (K). The first mono-molecular amphiphile layer deposited on the support surface 105 takes one of two possible orientations, depending upon whether the support surface is hydrophilic or lipophilic:

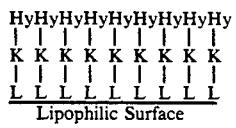

(4a)

(4b)

To achieve high second order polarizabilities, $\Omega^{(2)} > 10^{-9}$ esu, it is necessary that a high proportion of the amphiphile layers used to construct the L-B assemblies contain a molecular dipole linking group (M). For a linking group to be considered a molecular dipole linking group its second order polarizability, $\beta$, must be greater than $10^{-30}$ electrostatic units (esu). The following reflects the inclusion of a molecular dipole:

(5a)

(5b)

Each molecular dipole in turn is comprised of at least one electron donor (D), at least electron acceptor (A) and a linking group (E), specifically a conjugated p bonding system, which provides a pathway for charge transfer resonance between A and D:

$$\begin{array}{c} D \\ | \\ E \\ | \\ A \end{array} \qquad (6)$$

Taking into account the orientation of the molecular dipole M int he amphiphile, relationships 5a and 5b can be expanded into four relationships:

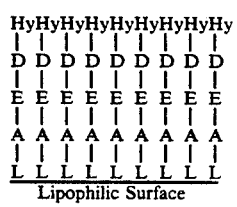

(7a)

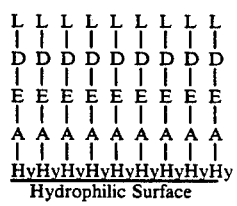

(7b)

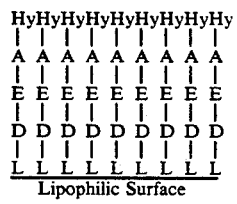

(7c)

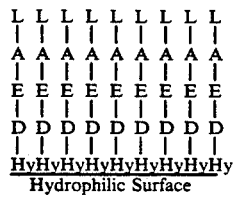

(7d)

Although the amphiphiles have been shown above as monomeric compounds, it is appreciated that the amphiphiles can be repeating units in a polymer, where the backbone of the polymer serves as the hydrophilic moiety Hy or the lipophilic moiety L. The following reflects polymeric linkage (—) of the amphiphiles:

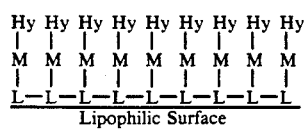

(8a)

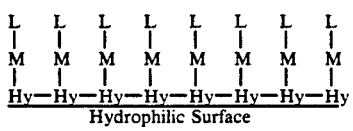

(8b)

Hydrophilic Surface

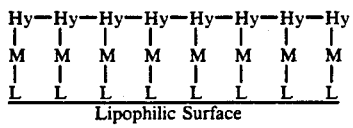

(8c)

Lipophilic Surface

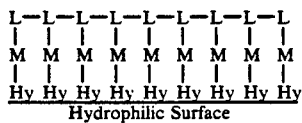

(8d)

Hydrophilic Surface

It is also possible to employ as spacer layers polymer amphiphiles which do not include molecular dipoles. It has been observed that higher levels of stability can be realized when one or more recurring amphiphile layers in an L-B layer unit are constructed using polymeric amphiphiles.

In the foregoing description only a single amphiphile layer is shown on a support. To satisfy the organic layer unit thicknesses required for the optical articles of the invention a large number of superimposed amphiphile monolayers are required. Multilayer L-B assemblies are characterized as X, Y or Z type assemblies, depending on the relative orientations of the amphiphile layers. In a Z type assembly the first amphiphile layer is oriented with the hydrophilic moiety nearest the support as shown at 4b, 5b, 7b, 7d, 8b and 8d above. The next and all subsequent amphiphile layers are deposited in the same orientation as the first amphiphile layer; that is, the hydrophilic moiety Hy is nearer the support than the lipophilic moiety L in each successive layer.

X type assemblies are similar to Z type assemblies, except that the lipophilic moiety L in each amphiphile layer is nearest the support. Thus, X type assemblies are constructed starting with the initial layer arrangements shown at 4a, 5a, 7a, 7c, 8a and 8c above. The next and all subsequent amphiphile layers are deposited in the same orientation as the first amphiphile layer; that is, the lipophilic moiety L is nearer the support than the hydrophilic moiety Hy in each successive layer.

X and Z type assemblies have the appeal of structural simplicity because all successive amphiphile monomolecular layers can be identical within an L-B layer unit.

Structurally more complex Y type L-B assemblies are not only feasible in the construction of the L-B layer 36, but also produce advantages in construction and stability. In Y type L-B assemblies hydrophilic moieties are deposited on hydrophilic moieties and lipophilic moieties are deposited on lipophilic moieties:

(9a)

Lipophilic Surface

(9b)

Hydrophilic Surface

One major advantage of Y type L-B assemblies is that they place the lipophilic moieties and hydrophilic moieties in adjacent positions in the layer sequence and thereby provide a more stable L-B assembly.

However, Y type L-B assemblies require at least two different types of amphiphiles. In one preferred form, two different amphiphiles, L-M-H and L-N-H, are required, where N represents a molecular dipole having its polarity reversed as compared with the molecular dipole M. In other words, if the molecular dipole M is oriented with its electron donor group adjacent the lipophilic moiety L, the molecular dipole N is oriented with its electron acceptor group adjacent the lipophilic moiety L, so that L-M-Hy is by expanded notation L-D-E-A-Hy while L-N Hy is by expanded notation L-A-E-D-Hy. If the same amphiphile were employed in each successive layer, a centrosymmetric structure would result in which the contribution of the molecular dipoles in each amphiphile layer to the second order polarization susceptibility, $\Omega^{(2)}$, which is directly proportional to the linear electro-optic coefficient, $r_{33}$, would be cancelled by the oppositely oriented molecular dipoles in the next adjacent layer.

An alternate Y type assembly, one that permits the use of only a single type of molecular dipole containing amphiphile, can be achieved by replacing every other amphiphile monomolecular layer with a amphiphile monomolecular spacer layer lacking a molecular dipole. The spacer amphiphiles can be identical to the amphiphiles containing molecular dipoles, except that the molecular dipole M or N is replaced by linking group (S) which exhibits a second order polarizability of less than $10^{-30}$ esu. In this arrangement the following layer sequences can be employed:

```
HyHyHyHyHyHyHyHy                                    (10a)
 | | | | | | | |
 M M M M M M M M
 | | | | | | | |
 L L L L L L L L
 L L L L L L L L
 | | | | | | | |
 S S S S S S S S
 | | | | | | | |
HyHyHyHyHyHyHyHy
HyHyHyHyHyHyHyHy
 | | | | | | | |
 M M M M M M M M
 | | | | | | | |
 L L L L L L L L
─────────────────
 Lipophilic Surface L L L L L L L L                                    (10b)
 | | | | | | | |
 N N N N N N N N
 | | | | | | | |
HyHyHyHyHyHyHyHy
HyHyHyHyHyHyHyHy
 | | | | | | | |
 S S S S S S S S
 | | | | | | | |
 L L L L L L L L
 L L L L L L L L
 | | | | | | | |
 N N N N N N N N
 | | | | | | | |
HyHyHyHyHyHyHyHy
─────────────────
 Hydrophilic Surface HyHyHyHyHyHyHyHy                                    (10c)
 | | | | | | | |
 S S S S S S S S
 | | | | | | | |
 L L L L L L L L
 L L L L L L L L
 | | | | | | | |
 N N N N N N N N
 | | | | | | | |
HyHyHyHyHyHyHyHy
HyHyHyHyHyHyHyHy
 | | | | | | | |
 S S S S S S S S
 | | | | | | | |
 L L L L L L L L
─────────────────
 Lipophilic Surface L L L L L L L L                                    (10d)
 | | | | | | | |
 S S S S S S S S
 | | | | | | | |
HyHyHyHyHyHyHyHy
HyHyHyHyHyHyHyHy
 | | | | | | | |
 M M M M M M M M
 | | | | | | | |
 L L L L L L L L
 L L L L L L L L
 | | | | | | | |
 S S S S S S S S
 | | | | | | | |
HyHyHyHyHyHyHyHy
─────────────────
 Hydrophilic Surface
```

In 9a and 9b each of the amphiphiles L-M-Hy and L-N-Hy must be capable of depositing on the other. This involves preparing an amphiphile that, in addition to exhibiting the high second order polarizability $\beta$ desired, also performs well as an L-B amphiphile in forming successive monomolecular layers. It is apparent that this requires amphiphile selection to be based on an acceptable balance of the ability of the amphiphile to perform two entirely different functions. It has been observed that amphiphiles having high $\beta$ values can perform entirely satisfactorily as deposition surfaces for other amphiphiles or when deposited on other amphiphiles, but lack the adherency required for deposition on themselves or similar amphiphiles. By having freedom to select the amphiphiles L-S-Hy in 10a-d lacking high $\beta$ values from a wide range of known amphiphiles strictly on the basis of their desirability in terms of L-B layer construction capabilities, the advantage can be realized of achieving higher deposition efficiencies and hence more uniform and stable L-B assemblies. Since spacer moiety S of the L-S-Hy amphiphiles can be relatively small in relation to the molecular dipoles M and N in the L-M-Hy and L-N-Hy amphiphiles, any reduction in the value of $\Omega^{(2)}$ attributable to the presence of spacer amphiphiles can be kept to a relatively low level.

In the foregoing discussion three successive amphiphile monolayer repeating units have been shown, which is the minimum number required to show the layer sequence. In practice many more successive layers are required to complete each of the L-B layer units.

The amphiphiles used to form the L-B layer units can be made up of hydrophilic moieties (head groups) Hy, lipophilic moieties (tail groups) L and linking groups K, including both spacer groups S and molecular dipoles M, that take a variety of different forms.

The following are illustrative of amphiphiles with varied hydrophilic moieties serving as head groups:

 (H-1)

 (H-2)

 (H-3)

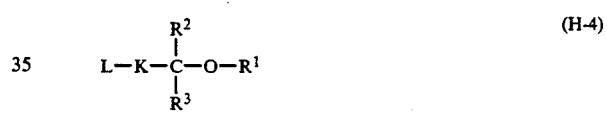 (H-4)

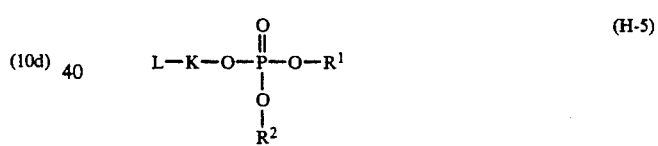 (H-5)

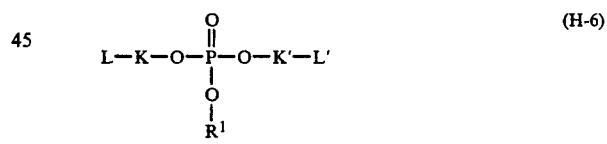 (H-6)

 (H-7)

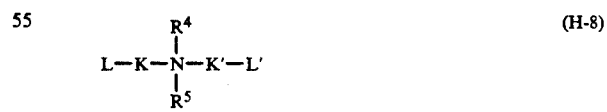 (H-8)

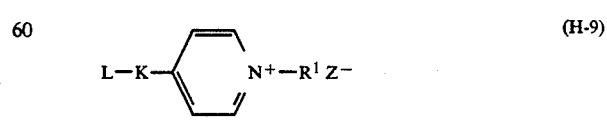 (H-9)

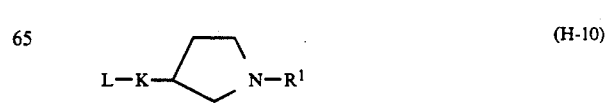 (H-10)

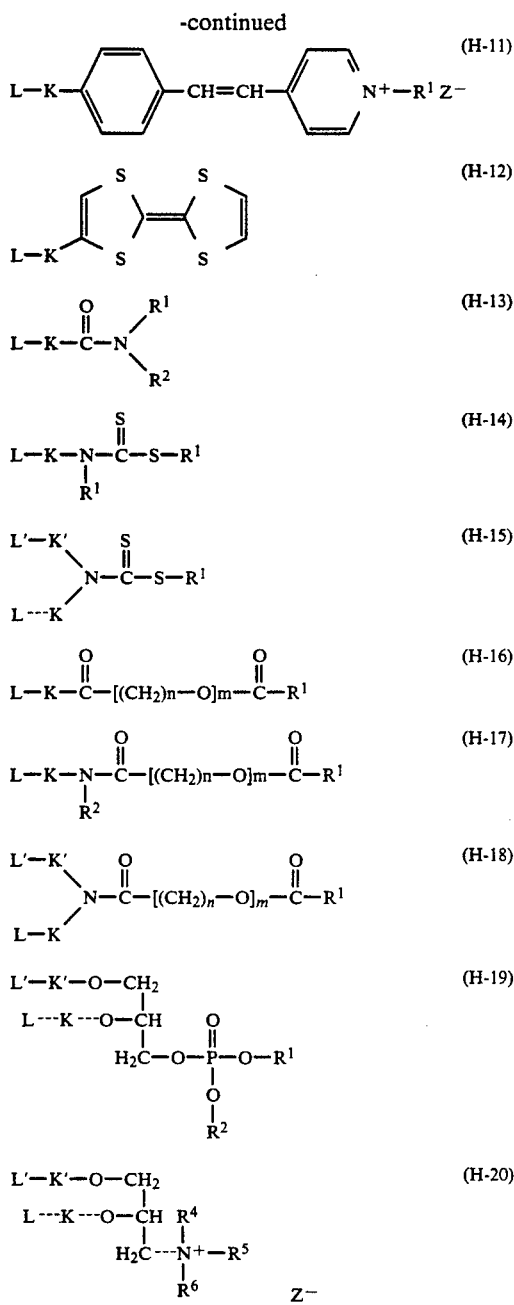

where the alkyl moieties preferably contain from 1 to 3 carbon atoms and the aryl moieties contain from 6 to 10 carbon atoms (e.g., phenyl or naphthyl moieties);

$R^4$, $R^5$ and $R^6$ independently represent any of the same hydrocarbon or substituted hydrocarbon groups as $R^1$ and $R^2$ or any two together represent carbon and optionally oxygen atoms completing a 4 to 7 member ring (e.g., an azetidine, pyrrole, pyrroline, pyrrolidine, morpholine or azepine ring); and Z represents a counter ion.

In addition to the simple head groups shown above it is additionally contemplated to employ head groups that are capable also as acting the electron acceptor, indicated by the prefix HA, or electron donor, indicated by the prefix HD, of the organic molecular dipole. The following are illustrative of such groups:

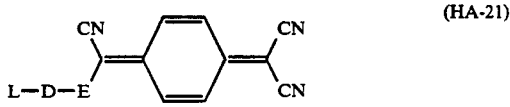 (HA-21)

L—D—E—NO$_2$ (HA-22)

L—D—E—CN (HA-23)

 (HA-24)

 (HA-25)

L—D—E—SO$_2$—CH$_3$ (HA-26)

 (HD-27)

where $R^7$ and $R^8$ are independently hydrogen, hydrocarbon or substituted hydrocarbon selected similarly as $R^1$ and $R^2$.

The lipophilic moieties or tail groups L are nonpolar groups. Depending upon the group to which the lipophilic moiety is attached, an alkyl group of from 1 to 3 carbon atoms (e.g., a methyl, ethyl or propyl group) can function effectively as a lipophilic moiety. Preferred lipophilic moieties are hydrocarbons that contain at least four carbon atoms, including alkyl, cycloalkyl, alkenyl groups, cycloalkenyl, aryl, alkaryl, and aralkyl moieties. To avoid excessive bulk the hydrocarbon lipophilic moieties are preferably limited to 24 or fewer carbon atoms. Alkyl and alkenyl groups of from about 4 to 20 carbon atoms are preferred. Aryl groups, such as phenyl, naphthyl and biphenyl, are specifically contemplated. Preferred cycloalkyl groups are those that contain from 5 to 7 ring carbon atoms. Halogen substitution of the hydrocarbons is recognized to increase their lipophilic properties. Fluoro-substituted hydrocarbons are specifically recognized to be highly lipophilic.

When the first and second amphiphiles are polymers and the repeating units of at least one of the amphiphile polymers contains a branched lipophilic moiety L of up to 9 carbon atoms, the optical attenuation within the where K and K' represent independently selected linking moieties;

L and L' represent independently selected lipophilic moieties;

m is an integer of from 1 to 20, preferably 1 to 10 and optimally from 1 to 6; n is an integer of from 1 to 6, preferably from 1 to 3 and optimally 2;

$R^1$, $R^2$ and $R^3$ are independently hydrogen or any synthetically convenient hydrocarbon or substituted hydrocarbon compatible with the desired hydrophilic character of the head group, these groups, when hydrocarbons, preferably being alkyl of from 1 to 10 carbon atoms, most preferably 1 to 5 carbon atoms. The alkyl groups can be substituted with common modifying groups, such as aryl, halo, hydroxy, alkoxy, and aryloxy moieties, organic layer unit formed by the Y type L-B assembly is exceedingly low. Specifically, optical attenuation levels are reduced to less than 2 dB/cm. It is preferred that both of the lipophilic moieties be formed of a branched hydrocarbon of 9 or fewer carbon atoms, particularly when each of the polymeric amphiphiles forming the Y type L-B assembly contains an organic molecular dipole moiety. In a specifically preferred form the branched lipophilic moiety exhibits the structure:

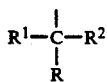 (12)

where R is hydrogen or a hydrocarbon and $R^1$ and $R^2$ represent separate hydrocarbons or together complete a cyclic hydrocarbon.

The branched lipophilic moiety can be chosen from among 2-propyl, 2-butyl, 2-(2-methylpropyl), 2-(2-methyl-butyl), 2-(2-ethylbutyl), 2-(3-methylbutyl), 2-pentyl, 2-(2-methylpentyl), 2-(3-methylpentyl), 3-pentyl, 3-(2,4-dimethylpentyl), 3-(3-ethylpentyl), 2-hexyl, 2-(2-methylhexyl), 2-(3-methylhexyl), 2-(4-methylhexyl), 2-(3-ethylhexyl), 2-(4-ethylhexyl), 2-heptyl, 4-heptyl, 4-(3-ethylheptyl), cyclopentyl, cyclohexyl, phenyl, tolyl, xylyl, ethylphenyl, norboranyl or similar cyclic and acylic branched hydrocarbons. As noted above, corresponding halohydrocarbon and halocarbon lipophilic moieties are even more lipophilic.

When the linking groups K function merely to provide a synthetically convenient linkage between the hydrophilic moieties Hy and the lipophilic moieties L, as in the amphiphiles Hy-S-L, they can take a wide variety of forms. While the Hy and L moieties are relied upon primarily to provide amphiphilic properties, linking groups are seldom entirely neutral moieties. When the linking group is a divalent hydrocarbon moiety, the demarcation between the linking group and lipophilic moiety is, of course, arbitrary. In other instances the linking group can contain one or more polar moieties, making it hydrophilic to some degree; however, the linking group is normally chosen to be less hydrophilic than the hydrophilic moiety Hy with which it is employed. When the linking moiety contains a hydrophilic or lipophilic portion, that portion is preferably attached to the hydrophilic or lipophilic moiety, so that it supplements the hydrophilic or lipophilic moiety in providing the desired amphiphilic properties to the molecule.

The following are representative of linking groups:

$-(CH_2)_n-$ (K-1)

where n is an integer of from 1 to 24, preferably from 4 to 20;

$-(CH_2)_n-Z-$ (K-2)

where n satisfies the K-1 definition and Z is a divalent oxy, —O—, thio —S— or amino —N($R^1$)— linkage with $R^1$ satisfying the definition above;

 (K-3)

where $Z^1$ represents an oxo, =O, or thione, =S, atom;

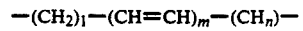 (K-4)

where l, m and n are each integers of from 4 to 20, with l+m+n preferably being no more than 20;

 (K-5)

where m and n are each integers of from 4 to 20, with m+n preferably being from 10 to 20;

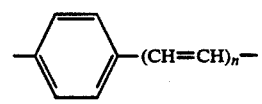 (K-6)

where n is an integer of from 1 to 10, preferably from 1 to 4;

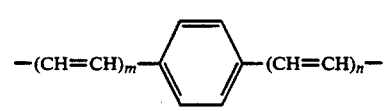 (K-7)

where m and n are each integers of from 1 to 10, preferably from 1 to 4;

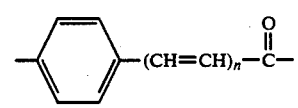 (K-8)

where n is an integer of from 1 to 10, preferably from 1 to 4;

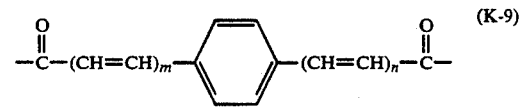 (K-9)

where m and n are each integers of from 1 to 10, preferably from 1 to 4;

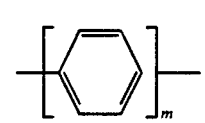 (K-10)

where m is an integer of from 1 to 5, preferably 1 or 2;

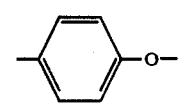 (K-11)

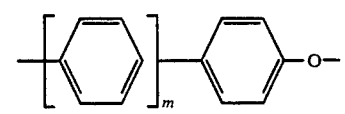 (K-12)

where m is an integer of from 1 to 5, preferably 1 or 2.

When the amphiphile contains an organic molecular dipole, —M—, the overall structure of the amphiphile can be represented as Hy-A-E-D-L or Hy-D-E-A-L. In the majority of instances the electron acceptor moiety is itself sufficiently hydrophilic to be employed as a head group. Thus, the preferred electron acceptor moieties for forming the Hy A-E-D-L amphiphiles are those described above identified by the prefix HA. An amine structure, HD-26, is shown above capable of acting as both a donor and a head group; however, electron donor moieties are in general not strongly hydrophilic moieties. When employed to form an Hy-D-E-A-L amphiphile, the electron donor moiety D is preferably employed with one of the preferred hydrophilic groups identified above by the prefix H. In addition to amines, exemplary electron donor moieties contemplated include oxy, —O—, and thio, —S—, moieties directly linked to a carbon atom of E and a carbon atom of Hy or L. The amine structure of HD-26, above can be converted to a L-D- -structure by replacing one or both of $R^1$ and $R^2$ with a more lipophilic group L of the type described above.

The electron acceptor —$SO_2$— particularly lends itself to forming Hy-D-E-A-L amphiphiles, since, unlike the other electron acceptors listed above, it lends itself to -A-L structures, such as

  (S-1)

where $R^9$ is $T^1$ or $T^2$. $T^1$ can be a multicarbon atom hydrocarbon or substituted hydrocarbon of the type described above for use as L groups, preferably those containing at least 5 carbon atoms and optimally at least 10 carbon atoms. $T^2$ requires a difluoro-substituted carbon atom attached to the sulfonyl, —$SO_2$—, moiety; that is, the a carbon atom. When $R^9$ takes the form of $T^2$, the structure can be represented as follows:

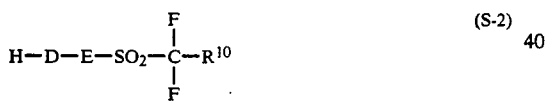  (S-2)

where $R^{10}$ can be hydrogen, fluorine, or any hydrocarbon or substituted hydrocarbon described above as being useful as a lipophilic moiety, but preferably is a hydrocarbon containing less than 10 and optimally less than 5 carbon atoms.

When the a carbon atom is difluoro substituted, the second order polarizability $\beta$ the molecule is enhanced. In addition the fluoro substituents markedly increase the hydrophobicity of the sulfonyl substituent. This allows the number of carbon atoms required to form the lipophilic moiety L to be reduced. For example, the moiety —$SO_2CH_3$ has moiety—i.e., an HA- moiety; but the moiety —$SO_2CF_3$ is a lipophilic acceptor moiety—i.e., an LA moiety. Further the trifluormethylsulfonyl moiety is a much more efficient electron acceptor than the methylsulfonyl moiety. Additional fluoro substitutions of $\beta$ and $\gamma$ carbon atoms increase the lipophilic character of the moieties satisfying formula S-2, but make progressively smaller additional contributions to second order polarizability.

The linking group E between the electron donor D and electron acceptor A can take the form of a conjugated $\pi$ bonding linkage of any convenient type. In the linking groups described above K-6, K-7 and K-10 provide the required conjugated x bonding linkage. The conjugated $\pi$ bonding linkages of K-4, K-8, K-9 and K-12 are, of course, not useful in forming organic molecular dipoles, since the conjugation is interrupted by one or more nonconjugated linkages. This prevents resonance between an excited state and a ground state required for useful organic molecular dipoles.

In the preferred conjugated $\pi$ bonding linkages E between the electron donor D and electron acceptor A moieties the terminal portions of the linkage are aromatic. In choosing a linkage E for an organic molecular dipole a number of factors must be taken into account in addition to the conjugated $\pi$ bonding linkage. Increasing the length of the linkage tends to increase the dipole moment and is therefore beneficial, but this must be balanced against reducing the resonance efficiency of the organic molecular dipole, which occurs as the conjugated $\pi$ bonding linkage is lengthened. In practice a balance is struck which has the net effect of achieving the highest attainable second order polarizability.

Lengthening the conjugated $\pi$ bonding linkage also has the property of increasing the wavelengths of electromagnetic radiation the molecular dipole will absorb. Thus, for a specific application, the length of the conjugated $\pi$ bonding linkage is limited by $\lambda$ as well as specific choices of the electron donor and acceptor moieties. Preferred linking groups produce molecular dipoles that are transparent to electromagnetic radiation in the near infrared and at least a portion of the visible spectra. Since the thickness of organic layer unit is a function of $\lambda$, it is apparent that for organic layer units of minimum thickness (and hence minimum numbers of L-B layers) preferred organic molecular dipoles are those that are transparent to light wavelengths extending into and, preferably, throughout the blue portion of the spectrum.

The following are preferred linking groups E:

  (E-1)

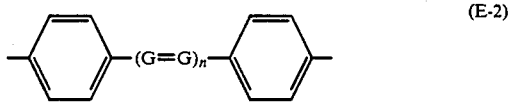  (E-2)

where G is independently in each occurrence methine or substituted methine, —$CR^{11}$—, or aza, —N=; $R^{11}$ is hydrogen or alkyl of from 1 to 3 carbon atoms; n is from 1 to 3 and optimally 1; with the further proviso that no more than two aza moieties are next adjacent.

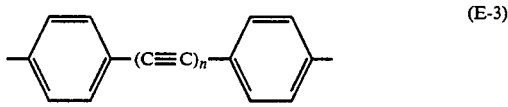  (E-3)

where n is as defined for E-2.

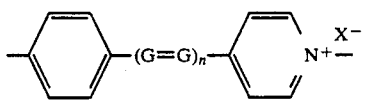

where G and n are as defined for E-2 and X— is a counter ion.

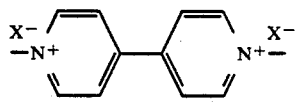
(E-5)

where X— is a counter ion.

In addition to the preferred conjugated π bonding linkages E shown above that are generally useful with terminal L-A-, Hy A-, L-D and Hy D- moieties of the type described above, other preferred linking groups particularly useful with sulfonyl electron acceptor moieties of the type disclosed by Ulman et al U.S. Pat. No. 4,792,208, the disclosure of which is here incorporated by reference, are specifically contemplated. In the preferred linking groups E-1 to E-5 no substituents to the various aromatic rings are shown. However, any of the $R^a$ and $R^d$ ring substituents of Ulman et al can be employed, if desired. Stilbene and diazobenzene linking groups E as well as their pyridinium analogues have been observed to provide an optimumbalance of synthetic convenience and optical advantages. The following are illustrations of organic molecular dipoles of employing these types of linking groups that have been observed to be particularly useful:

(MD-1) 4-(N-Methyl-N-octadecylamino)-4'-nitrostilbene
(MD-2) 4-(N,N-Dioctadecylamino)-4'-methylsulfonyl-stilbene
(MD-3) 4-{2-[4-(N,N-Dimethylamino)phenyl]ethenyl}-N-octadecylpyridinium chloride
(MD-4) 4-{2-[4-(N,N-Dimethylamino)phenyl]ethenyl}-N-docosanylpyridinium sulfate
(MD-5) 6-{N-methyl-N-[4-(4'-octadecylsulfonyl)stilbene]amino}hexanoic acid
(MD-6) 4-(N-Methyl-N-(3,6-dioxyoctan-8-ol)amino-4'-octadecylsulfonylstilbene Preferred L-B spacer units H-S-L are saturated and mono-unsaturated fatty acids containing from 16 to 24 carbon atoms, including hexadecanoic, octadecanoic, eicosanoic, docosanoic, 22-tricosenoic and tetradecanoic acids. Phosphates, such as $[CH_3(CH)_{12}(CH=CH)_2C(O)O(CH_6)O]_2P(O)OH$ and $[CH_3(CH)_4OC(O)CH=CH(p-C_6H_4)CH=CH)-C(O)O(CH_6)-O]_2P(O)OH$, are specifically contemplated for use as spacer units.

The foregoing elaboration of preferred amphiphiles has focused on monomeric structures. As noted above, it is also possible to employ polymeric amphiphiles. Polymeric amphiphiles offer advantages in layer stability. Polymers that are lipophilic in character can be transformed into amphiphiles by including one or more Hy-K- pendant groups, where the designation Hy-K- indicates the various forms of these groups described above. Similarly polymers that are hydrophilic in character can be transformed into amphiphiles by including one or more L-K- pendant groups, where the designation L-K- indicates the various forms of these groups described above.

The following are representative polymeric amphiphiles contemplated for use in forming L B layer units:

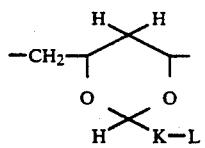
(P-1)

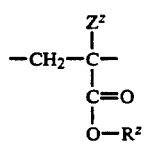
(P-2)

where $R^z$ represents -L or -K-L and $Z^z$ represents hydrogen, methyl, ethyl or cyano;

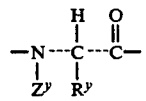
(P-3)

where $R^y$ represents -L or -K-L when $Z^y$ is hydrogen or alkyl of from 1 to 3 carbon atoms and $Z^y$ represents -L or -K-L when $R^y$ is hydrogen or alkyl of from 1 to 3 carbon atoms;

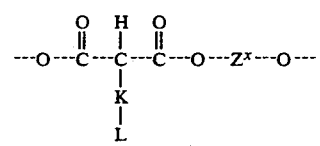
(P-4)

where $Z^x$ represents a divalent hydrocarbon containing from 1 to 12 carbon atoms (e.g., an alkanediyl, an alkenediyl, a cycloalkanediyl, phenylene, etc.);

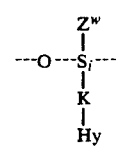
(P-5)

where $Z^w$ represents a hydrocarbon group of from 1 to 12 carbon atoms (e.g. alkyl or phenyl);

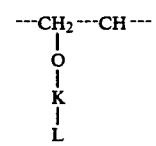
(P-6)

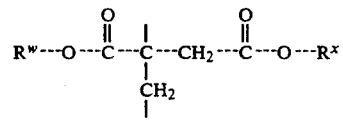
(P-7)

where one of $R^w$ and $R^x$ represents -K-L with the other being -K'-L' or any synthetically convenient lipophilic (-L) or hydrophilic (-Hy) moiety;

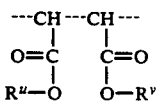 (P-8)

where one of $R^u$ and $R^v$ represents -K-L with the other being -K'-L' or any synthetically convenient lipophilic (-L) or hydrophilic (-Hy) moiety;

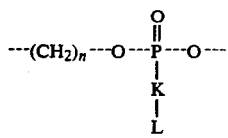 (P-9)

where n is an integer of from 2 to 4;

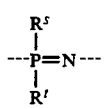 (P-10)

where one of $R^s$ and $R^t$ represents -K-L with the other being -K'-L' or any synthetically convenient lipophilic (-L) or hydrophilic (-Hy) moiety;

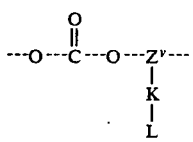 (P-12)

where $Z^v$ represents a trivalent hydrocarbon group of from 1 to 10 carbon atoms (e.g., a -K-L substituted alkanediyl or phenylene);

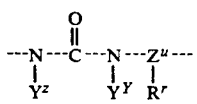 (P-12)

where at least one of $R^r$, $Y^y$ and $Y^z$ is -K-L and with any of $R^r$, $Y^y$ and $Y^z$ that are not -K-L being any synthetically convenient atom or group (e.g. hydrogen or alkyl or aryl of from 1 to 10 carbon atoms) and $Z^u$ represents a trivalent hydrocarbon group of from 1 to 10 carbon atoms (e.g., a substituted alkanediyl or phenylene);

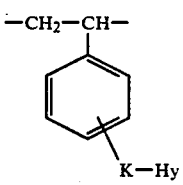 (P-13)

 (P-14)

where at least one $R^p$ and $R^q$ is -K-H and the remaining of $R^p$ and $R^q$ is -K'-H' or any synthetic convenient lipophilic, -L, or hydrophilic, Hy, moiety;

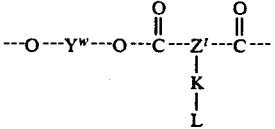 (P-15)

where $Y^w$ is a divalent hydrocarbon of from 1 to 12 carbon atoms (e.g. alkanediyl or phenylene) and $Z^t$ represents a trivalent hydrocarbon group of from 1 to 10 carbon atoms (e.g., a substituted alkanediyl or phenylene);

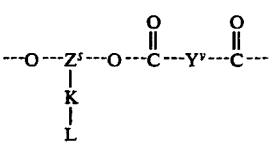 (P-16)

where $Y^v$ is a divalent hydrocarbon of from 1 to 12 carbon atoms (e.g. alkanediyl or phenylene) and $Z^s$ represents a trivalent hydrocarbon group of from 1 to 10 carbon atoms (e.g., a substituted alkanediyl or phenylene);

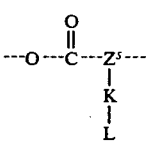 (P-17)

where Zs is as previously defined;

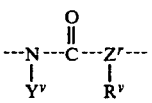 (P-18)

where $R^v$ represents -K-L when $Y^v$ is hydrogen or alkyl of from 1 to 3 carbon atoms and $Y^v$ represents -K-L when $R^v$ is hydrogen or alkyl of from 1 to 3 carbon atoms and $Z^r$ represents a trivalent hydrocarbon group of from 1 to 10 carbon atoms (e.g., a substituted alkanediyl or phenylene);

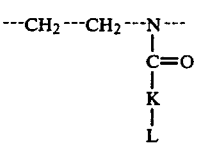 (P-19)

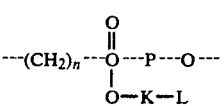 (P-20)

where n is the integer 2, 3 or 4;

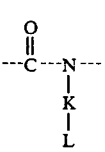 (P-21)

-continued

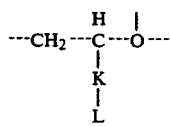
(P-22)

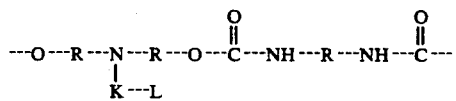
(P-23)

where R is $-(CH_2)_n-$ or $-(CH_2OCH_2)_m-$ and n and m are integers of from 1 to 6;

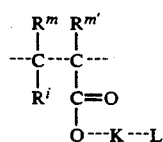
(P-24)

where $R^i$, $R^m$ and $R^{m'}$ can be independently hydrogen or any synthetically convenient hydrophilic, -Hy, or lipophilic, -L, moiety;

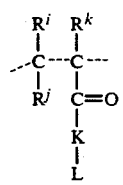
(P-25)

where $R^i$, $R^j$ and $R^k$ can be independently hydrogen or any synthetically convenient hydrophilic, -Hy, or lipophilic, -L, moiety;

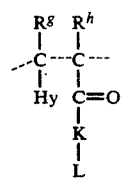
(P-26)

where $R^g$ and $R^h$ can be independently hydrogen or any synthetically convenient hydrophilic, -Hy, or lipophilic, -L, moiety;

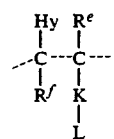
(P-27)

where $R^e$ and $R^f$ can be independently hydrogen or any synthetically convenient hydrophilic, -Hy, or lipophilic, -L, moiety;

(P-28)

where $R^c$ is any synthetically convenient divalent hydrocarbon of from 1 to 12 carbon atoms (e.g., alkanediyl or phenylene).

The following are illustrative of polymers containing H-M-L repeating units linked through either the -H or -L moieties:

(PM-1)
Poly{4'-N-methyl-N-[2-(2-acryloyloxethoxy)eth-oxy]-ethy lamino-4-octadecylsulfonyl azobenzene}
(PM-2)
Poly{4'-N-methyl-N-[2-(2-acryloyloxethoxy)eth-oxy]-ethy lamino-4-octadecylsulfonyl azobenzene-co-2-hydroxyethyl acrylate} [1:4–6 mole ratio]
(PM-3)
Poly{4'-dioctadecylamino-4-(6-acryloyloxy)hexyl-sulfony l azobenzene-co-2-hydroxyethyl acrylate} [1:4–6 mole ratio]
(PM-4)
Poly{4'-N-methyl-N-(8-acryloyloxy)octylamino-4-octadecy lsulfonyl azobenzene-co-N,N-dimethyl acryl-amide} [1:4–6 mole ratio]
(PM-5)
Poly{N-[2-(hexamethyleneiminocarbonyloxy)ethyl]-N-[2-(i minocarbonyloxy)ethyl]-N-[4-(4'-octa-decyl-sulfonylazob enzene]amine}

The following are illustrative of polymers containing H-S-L repeating units linked through either the -H or -L moieties:

(PS-1) Poly(t-butyl methacrylate)
(PS-2) Poly(i-butyl methacrylate)
(PS-3) Poly[2-(methacryloyloxy)ethoxysuccinoyl-N,N-d i-octadecy lamide-co-2-hydroxyethyl acrylate] [5-10:1 mole ratio]
(PS-4) Poly[oxy(dioctadecyl)malonyloxyethyloxyethyl]
(PS-5) Poly[oxyadipoyloxy(2,2-dioctadecyl)propylene]
(PS-6) Poly[oxycarbonyliminehexamethyleneiminocarbon yl-oxy(2,2 -dioctadecylpropylene)]
(PS-7) Poly(γ-methyl-L-glutamate-co-γ-n-octadecyl-glutamate)

From a review of the various polymers listed above it is apparent that in most instances the hydrophilic and lipophilic moieties can be present before polymerization. It therefore follows that in most instances the monomers from which the polymers are formed are themselves amphiphiles. The degree of polymerization can vary widely, ranging from dimers through oligomers and lower molecular weight polymers with maximum molecular weights being limited only by the ability of the polymers to retain their fluid properties under L-B assembly construction conditions. It is generally preferred to employ polymers that have molecular weights of less than about 20,000. The polymers can be homopolymers or polymers that contain mixtures of repeating units with compatible Langmuir-Blodgett film-forming properties.

The major surface 105 of the layer on which the organic layer unit is formed can take any convenient conventional form. The support portion 42 can be chosen so that the major surface is either hydrophilic or hydrophobic, thereby allowing the desired orientation of the L-B layer 36 on the major surface. When the support is not itself initially transparent to λ and of a lower refractive index than the L-B layer, it is recognized that a conventional buffer layer can be employed to correct these deficiencies. Buffer layers of the type disclosed in U.S. Pat. Nos. 4,946,235; 4,948,225; 4,955,977 and 4,971,426, the disclosures of which are here incorporated by reference, are specifically contemplated.

EXAMPLES

The invention is described and appreciated by reference to the following specific Examples. Examples 1 through 9 demonstrate the feasibility and advantages of constructions incorporating Y type L-B assemblies and the inferiority of X and Z type L-B assemblies. Example 10 demonstrates the feasibility and advantages of the embodiment of the electro-optic waveguide deflector involving the liquid-crystal overlay cell.

In Examples 1 through 9, preparations of Langmuir-Blodgett layer units were carried out using a commercial Langmuir two compartment trough mechanically equipped to transfer the substrate from one trough to the other, either while submerged in water contained in the reservoir or while held above the liquid reservoir. This permitted deposition on the substrate of different materials in each the two compartments in sequence permitting the film in each compartment to provide multiple layers on the substrate as the operation was repeated.

In some of the examples, evidence of nonlinear optical activity was measured by second harmonic generation (SHG). It will be appreciated that SHG is also a measure of the absolute magnitude of the linear electro-optic coefficient $r_{33}$.

EXAMPLE 1

The purpose of this example is to demonstrate the capability of successful formation of a Y-type L-B assembly like 10c above but with polymer amphiphiles.

In one compartment a polymeric amphiphile PM-2 (hereinafter referred to as Film A) was dissolved in chloroform, spread on the surface of a pool of pure water and compressed. The amphiphile PM-2 can be schematically represented as Hy-D-E-A-L, where polymerization was through the Hy moiety.

In the other compartment polymeric amphiphile PS-1 (hereinafter also referred to as Film B) was dissolved in chloroform, spread on the surface of a pool of pure water and compressed. The polymeric amphiphile PS-1 can be schematically represented as Hy-S-L, where polymerization was through the Hy moiety.

Alternate deposition of PM-2 and PS-1 onto a silicon substrate made hydrophobic by reaction with octadecyl trichlorosilane by standard procedures was performed in a Film B before Film A (B/A) sequence fashion until six B/A bilayers were deposited. Six B layers were then deposited on top of the B/A layers.

This film was measured ellipsometrically where thickness varied less than 5% across the film and was (302 Å) which is within 10% of expected values based on ellipsometric measurement of films A and B individually.

Second Order nonlinear optical activity was measured by Second Harmonic Generation (SHG) in reflection mode using 1064 nm input wavelength and measuring output intensity at 532 nm using an optical system similar to that reported frequently in the literature, which showed an increase in signal intensity, +3.25 volts relative to the uncoated substrate.

EXAMPLE 2 (A CONTROL)

The purpose of this example is to illustrate the deposition advantage achieved in Example 1 by employing the spacer amphiphiles (PS-1). The procedure of Example 1 was repeated, except that no spacer amphiphile PS-1 was employed. Instead, a first layer of PM-2 was deposited on the substrate, followed directly by second, third and subsequent layers of the same amphiphile, with layer thickness measurements being undertaken after each layer deposition.

Observations revealed that PM-2 failed to adhere to itself resulting in a failure to produce a multilayer structure. This failure can be expressed as the Film Transfer Ratio (FTR), which is a measurement of monolayer uptake by the substrate, where a complete layer should equal a ratio of 1.0. For the initial monolayer, the FTR was 1.01. For the second layer the FTR was only 0.08. Deposition of the third layer revealed an FTR of 0.749. Film thickness characterization was measured by ellipsometry. Sample thickness measured for the initial monolayer was (32 Å + 1 Å). The thickness after the third layer deposition cycle varied randomly across the substrate between (41 Å and 83 Å). At no point on the film did the thickness reach the expected value of 96 Å) for a 3-layer film.

EXAMPLE 3

The purpose of this example is to demonstrate the feasibility of substituting an Hy-A E-D-L amphiphile for an Hy-D-E-A-L amphiphile. A procedure similar to that described in Example 1 was employed, except that the amphiphile PM-3 was substituted for PM-2. The amphiphile PM-3 can be schematically represented as Hy-A-E-D-L, where polymerization was through the Hy moiety. The significant difference in the amphiphile PM-3 as compared to PM-2 was the reversed orientation of the molecular dipole A-E D in the polymer side chain.

Designating the PM-3 amphiphile layers as Film A and the PS-1 amphiphile layers as Film B, alternate deposition of these two materials onto a silicon substrate made hydrophobic by reaction with octadecyl trichlorosilane by standard procedures was performed in A/B fashion until an ABABA sequence of five layers had been deposited.

Film layer thickness measurements revealed that the layers were well formed, showing feasibility of employing PM-3 and PS-1 in combination to form an L-B layer unit.

EXAMPLE 4 (A CONTROL)

The purpose of this Example is to demonstrate the advantage of depositing the spacer amphiphile PS-1 on itself as compared to the amphiphile PM-3. Onto the ABABA layer sequence of Example 3 an additional A layer was deposited to permit the subsequent deposition of B layers with inverted orientations. In other words, after depositing to two AB bilayers, two A layers were deposited, to permit subsequent deposition of BA bilayers.

The last A layer of the initial five layer sequence exhibited an FTR of 0.9. The A layer deposited directly on the last A layer (the sixth layer overall) exhibited an FTR of 0.98. However, the next deposited B layer (the seventh layer overall) exhibited an FTR of −0.5, indicating removal of a portion of the preceding A layer. The next A layer (the eighth layer overall) exhibited an FTR of 1.0, with the next B layer (the ninth layer overall) again exhibiting an FTR of −0.5.

The thickness measured by ellipsometry for this film after 10 deposition strokes was (131 Å). Based on thickness measurements of the individual materials the thickness of such a film should be (232 Å). In fact the thickness is only (15 Å), greater than calculated for layers 1 through 5 showing that the second half of the film structure did not form.

EXAMPLE 5

The purpose of this Example is to demonstrate the preparation of a thicker L-B layer unit. The procedure of Example 1 employed to produce 93 B/A bilayers in which PM-2 was employed to form the A layers and PS-2 was employed to form the B layers.

Film thickness characterization was measured by ellipsometry (thickness variability) and second order nonlinear optical activity was measured by SHG in a reflection mode using a 1064 nm input wavelength and measuring output intensity at 532 nm using a conventional optical system. Sample thickness varied less than 5% across this film and was (3992 Å), which is within 5% of expected thickness based on the ellipsometric measurement of films of A and B individually. Film characterization by SHG showed a higher signal relative to thinner films. This corroborated a greater thickness.

EXAMPLE 6

The purpose of this example is to demonstrate the preparation of a thicker L-B layer unit. The procedure of Example 5 was repeated to produce an L-B layer unit containing 131 B/A bilayers, with PM-1 being employed to form the A layers and PS-2 being employed to form the B layers.

This film was visually clear and was tested for its ability to guide light. Polarized light from a Helium-Neon laser at 633 nm was coupled into the film through a prism by mechanical contact with the glass substrate. This film was able to guide light, with a propagation streak the entire length of the sample (over 3 cm). Attenuation of the Light beam was measured to be approximately 1 dB/cm of film length.

EXAMPLE 7

This example has as its purpose to demonstrate the preparation of a thicker L-B layer unit with variances in substrate and amphiphiles. The procedure of Example 6 was repeated to produce an L-B layer containing 124 B/A bilayers, with PM-2 being employed to form the A layers and PS-1 being employed to form the B layers. The substrate was soda-lime glass coated with a 1500 to 2000 Å layer of indium tin oxide (ITO). The layer sequence was completed by six B layers, demonstrating the self-adherency of PS-1.

EXAMPLE 8

This example has as its purpose to demonstrate the efficiency of a monomeric spacer amphiphile. This example also further illustrates the capability of controlling L-B layer unit thicknesses and to obtain thicknesses that correlate well with those expected from individual layer thicknesses.

Preparation of an L-B layer unit was carried out using arachidic acid (i.e., eicosanoic acid) and methyl arachidate together as H-S-L monomeric spacer amphiphiles to form A films. Arachidic acid and methyl arachidate were dissolved in chloroform in a 9:1 molar ratio, spread on water and compressed into a monolayer film. The water was pure with a 0.003 M concentration of cadmium ion added, which converted arachidic acid to cadmium arachidate. Three layers of the A film were deposited onto a hydrophilic silicon substrate for a length of 52 mm. A fourth layer of the A film was deposited for a length of 42 mm. The film layer at the air/water interface was removed by aspiration after film deposition. PM-1 was dissolved in chloroform, spread on the same water solution and compressed into a monolayer B film. The B film was deposited onto the existing A film layers, creating an A/B bilayer with the fourth cadmium arachidate and methyl arachidate layer. After deposition, the B film layer was also removed from the air/water interface. Arachidic acid and methyl arachidate in chloroform were again spread and compressed into a monolayer A film and deposited onto the existing film structure, this time for a length of 32 mm. PM-1 in chloroform was spread, compressed into a monolayer B film and deposited onto the existing film layer structure, creating two A/B bilayers. A third A/B Bilayer was deposited in the same manner as the second A/B bilayer. A bilayer of cadmium arachidate was deposited on top of the film for a length of 18 mm creating a step film structure with the following relative (not-to-scale) architecture:

```
AAAAAAA
AAAAAAA
BBBBBBBBBBB
AAAAAAAAAAA
BBBBBBBBBBB
AAAAAAAAAAA
BBBBBBBBBBBBBBB
AAAAAAAAAAAAAAA
AAAAAAAAAAAAAAAAAAAA
AAAAAAAAAAAAAAAAAAAA
AAAAAAAAAAAAAAAAAAAA
```
Substrate Film thickness characterization was measured by ellipsometry (thickness variability). Sample thickness varied less than 5% across each film step (89 Å, 146 Å, 272 Å, and 328 Å) and was within 5% of overall expected thickness (326 Å) based on the ellipsometric measurement of monolayers of A and B individually.

EXAMPLE 9

The purpose of this example is to demonstrate the capability of forming a Y type Langmuir-Blodgett assembly like that of 9a above, but with polymer amphiphiles. By being able to employ molecular dipole containing amphiphiles in next adjacent layers of the L-B layer the potential exists for a four-fold increase in conversion efficiency as compared to employing a spacer amphiphile in alternate monomolecular layers.

PM-3 was dissolved in chloroform, spread on pure water and compressed into a monolayer A film. The A film was deposited onto a silicon substrate, which was made hydrophobic by reaction with octadecyl trichlorosilane by standard procedures. The film was deposited as a monolayer for a length of 60 mm. The A film layer at the air/water interface was removed by aspiration after film deposition. PM-1 was dissolved in chloroform, spread on pure water and compressed into a monolayer B film. The B film was deposited onto the existing A film layer, creating an A/B bilayer. After deposition, this film layer was also removed from the air/water interface. PM-3 in chloroform was again spread and compressed into a monolayer A film and deposited onto the existing A/B bilayer for a length of 42 mm. PM-1 in chloroform was spread, compressed into a monolayer film and deposited onto the existing film layer structure, creating two A/B bilayers. A third A/B bilayer was deposited in the same manner as bilayers 1 and 2, only for a length of 33 mm. A fourth A/B bilayer was deposited, similar to bilayers 1, 2, and 3, for a length of 23 mm, creating a step film architecture.

Film thickness characterization was measured by ellipsometry (thickness variability) and second order nonlinear optical activity by SHG in a reflection mode using a 1064 nm input wavelength and measuring output intensity at 532 nm using a conventional optical system. Sample thickness varied less than 5% across each bilayer (67 Å, 152 Å, 223 Å, and 290 Å respectively) and was within 10% of overall expected thickness (272 Å) based on the ellipsometric measurement of monolayers of A and B individually. Film characterization by SHG showed incremental signal enhancement relative to the bilayer increments, as well as film uniformity for each bilayer.

EXAMPLE 10

A p+ silicon substrate with 3 $\mu$m of $SiO_2$ on one side and with an aluminum metal ohmic contact on the other was rf sputter-coated with a 0.32 $\mu$m thick film of $Ta_2O_5$ on the oxide side. Input and output coupler gratings were then formed by holographically exposing photoresist which had been spun on the $Ta_2O_5$ waveguide. The resist grating was then transferred to the $Ta_2O_5$ film by milling and the resist was removed. The input and output grating patches were separated by 1.125 inches. A SiO alignment film about 50 Angstroms in thickness was then evaporated at an oblique angle of incidence to the $Ta_2O_5$ film surface in the region between the two gratings. Mylar spacers 12.5 $\mu$m in thickness were then applied to the $Ta_2O_5$ surface to form the side containment walls for the liquid crystal overlay cell. An upper cover was formed from a fused silica glass plate upon which about 50 nm of conductive transparent ITO had been deposited. The ITO film was photolithographically processed to yield two right-angle prism-shaped electrodes which were separated by 0.020 inches along the prism hypotenuses.

The prism heights were about 0.125 inches and their lengths along the direction of the propagation of light were 1.9 cm. A second SiO alignment layer was deposited on top of the ITO electrode pattern and the cover plate was placed on top of the mylar spacers with the ITO electrode pattern facing the silicon wafer. The cell was filled with E. Merck type ZLI-1289 nematic liquid crystal.

Figure 5:
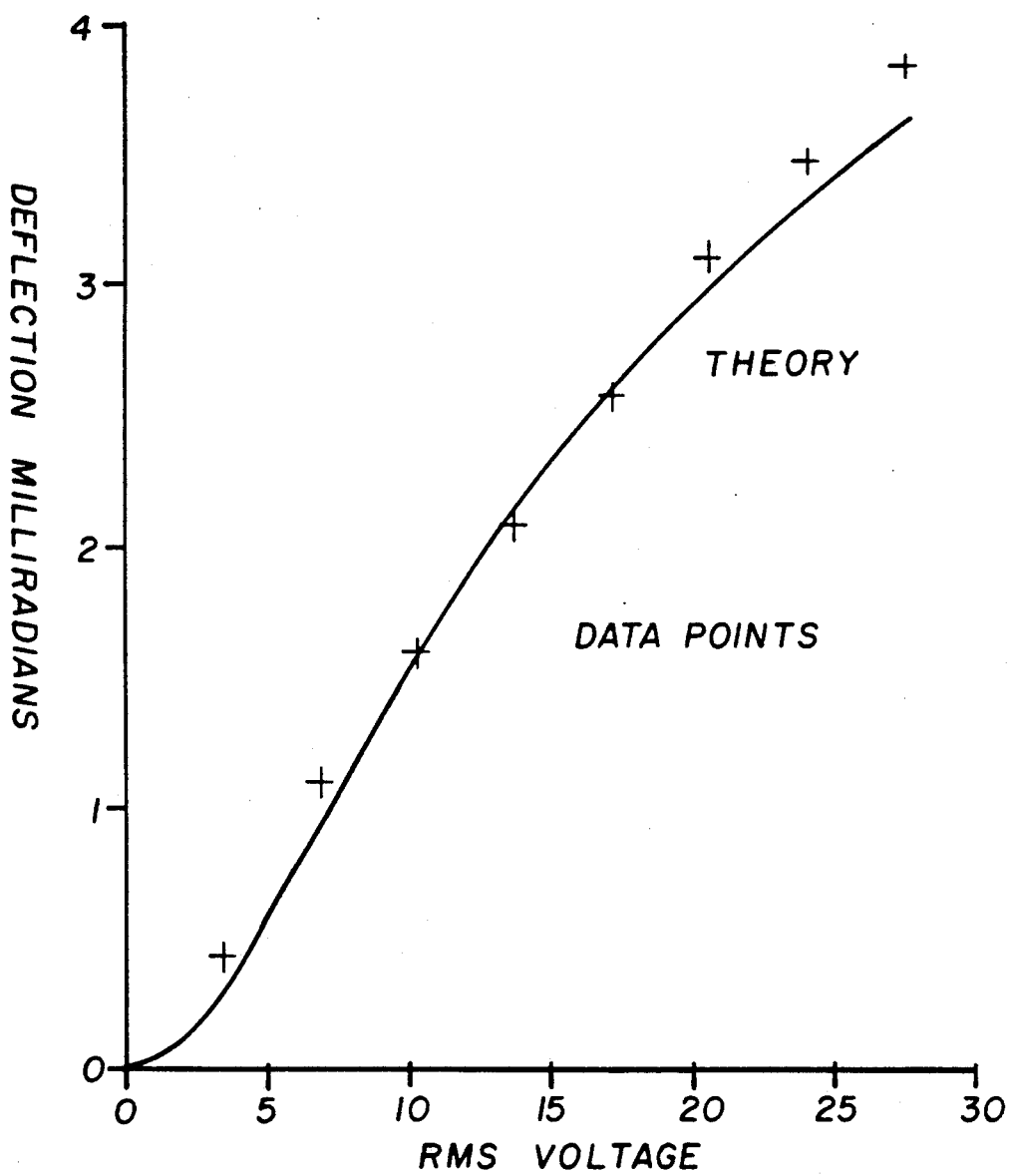
FIG. 5 is a graph of data and theory showing deflection of a beam of light as a function of applied voltage for a liquid-crystal overlay electro-optic waveguide deflector.

Electrical contact was made separately to each surface prism electrode by means of contact pads which were part of the photolithographically produced ITO structure. The aluminum contact layer on the backside of the p+ silicon wafer was connected to ground. A voltage supply with 5 kHz sinusoidal carrier and a ramped amplitude was connected alternately to one prism electrode and then the other while the remaining prism electrode was shorted to ground. Light from a helium-neon laser was coupled into the $Ta_2O_5$ waveguide by means of the input grating coupler, passed beneath the liquid-crystal overlay cell, and coupled out of the waveguide by means of the second grating coupler. The deflection of the beam was monitored and a plot of the observed deflection as a function of the rms value of the voltage applied to the liquid-crystal cell is shown in FIG. 5. Also shown in FIG. 5 is a plot of results calculated from the theory of Hu and Whinnery mentioned earlier. The data shows that about ±4 milliradians of deflection can be obtained for a rms voltage of about 30 volts. This corresponds to a spot displacement of about ±12 $\mu$m for an objective lens with a 3 mm focal length. Theoretical calculations predict that spot displacements up to ±30 $\mu$m should be possible at higher voltages with optimized waveguide design.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed:

1. An integrated electro-optic waveguide deflector, comprising:
   a planar electrode;
   an optical waveguide layer for deflecting light, said waveguide layer overlying said planar electrode and having a refractive index;
   a pair of spaced electrodes overlying said waveguide layer, each of said electrodes having a prism configuration defining a prism angle; and
   means for selectively applying an electric field between said pair of electrodes and said planar electrode so that deflection varies with applied voltage according to a formula:

$$\Delta\Theta \approx \frac{2\Delta n}{n} \tan \Gamma,$$

where $\Delta\Theta$ is the deflection angle of a collimated beam in the waveguide layer, $\Delta n$ is the electro-optically induced index change, n is the effective index of refraction of the waveguide, and $\Gamma$ is the prism angle.

2. The electro-optic waveguide deflector of claim 1 wherein said waveguide layer is a film formed of a material having a high second order susceptibility.

3. The electro-optic waveguide deflector of claim 1 wherein said waveguide layer is a film formed of a copolymer with a first comonomer having a high degree of optical nonlinearity and a second comonomer affecting physical properties of the copolymer other than optical nonlinearity.

4. The electro-optic waveguide deflector of claim 3 wherein said copolymer is electrically poled.

5. The electro-optic waveguide deflector of claim 1 wherein said waveguide layer contains a Langmuir-Blodgett film formed of noncentro-symmetric molecules oriented in the same direction to automatically pole said film.

6. The electro-optic waveguide deflector of claim 5 wherein said film has a plane and said molecules are oriented perpendicular to said plane.

7. The electro-optic waveguide deflector of claim 1 wherein said waveguide layer is a film formed of electrically poled nonlinear optic organic polymers.

8. An integrated electro-optic waveguide deflector, comprising:
   a base support;
   a planar electrode layer disposed on a surface of said base support;
   a first buffer layer disposed atop said first electrode layer, said first buffer layer comprising a transparent dielectric material;
   an optical waveguide layer having a refractive index and being positioned on said base support and overlying said first buffer layer and said planar electrode;
   a second buffer layer deposited atop said waveguide layer, said second buffer layer comprising a transparent dielectric material, said first and second buffer layers each having a refractive index lower than the refractive index of the waveguide layer;
   a third layer of transparent material having a refractive index approximately equal to the refractive index of said waveguide layer and having a higher refractive index than said first and second buffer layers and being positioned between said first buffer layer and said waveguide layer;
   a pair of spaced electrodes atop said second buffer layer, each of said electrodes having a preselected geometrical configuration; and
   means for selectively applying an electric field between said pair of electrodes and said planar electrode so that deflection varies with applied voltage according to the geometrical configuration of said pair of spaced electrodes.

9. The electro-optic waveguide deflector of claim 8 wherein said waveguide layer is a film deposited on said first buffer layer by Langmuir-Blodgett technique.

10. The electro-optic waveguide deflector of claim 8 wherein said waveguide layer is a film deposited on said first buffer layer by spin-coating or dip-coating.

11. The electro-optic waveguide deflector of claim 8 wherein said waveguide layer is a film deposited on said first buffer layer by sputtering or evaporation.

12. The electro-optic waveguide deflector of claim 8 wherein the physical positions of the planar electrode and the pair of spaced electrodes are interchangeable so that the planar electrode is positioned atop the second buffer layer and the pair of spaced electrodes is positioned on the base support.

13. The electro-optic waveguide deflector of claim 8 said base support is a silicon substrate and the planar electrode is a substrate electrode formed by p+ doping said silicon substrate.

14. A method for forming an integrated electro-optic waveguide deflector, comprising:
   forming a planar electrode;
   positioning an optical waveguide layer to overlay said planar electrode for deflecting light, said waveguide layer having a refractive index;
   positioning a pair of spaced electrodes to overlay said waveguide layer, each of said electrodes having a prism configuration defining a prism angle; and
   selectively applying an electric field between said pair of electrodes and said planar electrode so that deflection varies with applied voltage according to a formula:

$$\Delta\Theta \approx \frac{2\Delta n}{n} \tan \Gamma,$$

where $\Delta\Theta$ is the deflection angle of a collimated beam in the waveguide layer, $\Delta n$ is the electro-optically induced index change, n is the effective index of refraction of the waveguide, and $\Gamma$ is the prism angle.

15. The method of claim 14 including forming said waveguide layer of a film of a material having a high second order susceptibility.

16. The method of claim 14 including forming said waveguide layer of a film of a copolymer with a first comonomer having a high degree of optical nonlinearity and a second comonomer affecting physical properties of the copolymer other than optical nonlinearity.

17. The method of claim 14 including forming said waveguide layer of a Langmuir-Blodgett film having noncentro-symmetric molecules oriented in the same direction to automatically pole said film.

18. The method of claim 14 including forming said waveguide layer of a film of electrically poled nonlinear optic organic polymers.

19. A method for forming an integrated electro-optic waveguide deflector, comprising:
   forming a base support;
   disposing a planar electrode layer on a surface of said base support;
   disposing a first buffer layer comprising a transparent dielectric material atop said first electrode layer;
   positioning an optical waveguide layer having a refractive index on said base support overlying said first buffer layer and said planar electrode;
   depositing a second buffer layer comprising a transparent dielectric material atop said waveguide layer, said first and second buffer layers each having a refractive index lower than the refractive index of the waveguide layer;
   positioning a third layer of transparent material having a refractive index approximately equal to the refractive index of said waveguide layer and having a higher refractive index than said first and second buffer layers between said first buffer layer and said waveguide layer;
   positioning a pair of spaced electrodes atop said second buffer layer, each of said electrodes having a preselected geometrical configuration; and
   selectively applying an electric field between said pair of electrodes and said planar electrode and varying deflection with applied voltage according to the geometrical configuration of said pair of spaced electrodes.

* * * * *